United States Patent [19]
Hinrichs et al.

[11] Patent Number: 5,946,695
[45] Date of Patent: Aug. 31, 1999

[54] METHOD FOR VIEWING AND PROVIDING TO A USER PARAMETER-SPECIFIC INFORMATION

[75] Inventors: Earl L. Hinrichs; Hung Quoc Doan, both of Boise; Jeff L. Cowan, Meridian; James W. McGill, Jr., Boise; Greg A. Raburn, Caldwell; Greg P. Johnson, Boise, all of Id.

[73] Assignee: Micron Electronics, Inc., Nampa, Id.

[21] Appl. No.: 08/954,222

[22] Filed: Oct. 20, 1997

[51] Int. Cl.$^6$ .................................................. G06F 17/30
[52] U.S. Cl. ................................ 707/103; 707/3; 707/4; 711/203
[58] Field of Search ................................. 707/3, 103, 4; 711/203

[56] References Cited

U.S. PATENT DOCUMENTS

| | | | |
|---|---|---|---|
| 5,426,747 | 6/1995 | Weinreb et al. | 711/203 |
| 5,452,456 | 9/1995 | Mourey et al. | 395/653 |
| 5,574,837 | 11/1996 | Clark et al. | 345/440 |
| 5,694,598 | 12/1997 | Durand et al. | 707/103 |
| 5,721,908 | 2/1998 | Lagarde et al. | 707/10 |
| 5,732,219 | 3/1998 | Blumer et al. | 395/200.57 |
| 5,740,431 | 4/1998 | Rail | 707/200 |
| 5,742,845 | 4/1998 | Wagner | 395/831 |
| 5,768,597 | 6/1998 | Simm | 395/712 |
| 5,774,670 | 6/1998 | Montulli | 395/200.57 |
| 5,838,916 | 11/1998 | Domenikos et al. | 395/200.49 |
| 5,873,093 | 2/1999 | Williamson et al. | 707/103 |
| 5,878,411 | 3/1999 | Burroughs et al. | 707/4 |

*Primary Examiner*—Paul R. Lintz
*Assistant Examiner*—Ella Colbert

[57] ABSTRACT

The present invention provides to a user parameter-specific information. In one embodiment, a server receives from a client a parameter-specific information request, which identifies at least one parameter corresponding to the requested parameter-specific information. A file processing program is then invoked to process a first information file. The file processing program reads from the first information file code segments, including both client-displayable segments and segments executable by the file processing program ("FPP-executable code segments"). If the code segment is client-displayable, the file processing program sends to the client the client-displayable code from the client-displayable code segment. On the other hand, if the code segment is FPP-executable, the file processing program executes the FPP-executable code. In doing so, it sends to the client additional client-displayable code in response to the at least one parameter identified in the information request. The client-displayable code sent to the client is then displayed by the client as its parameter specific information.

3 Claims, 7 Drawing Sheets

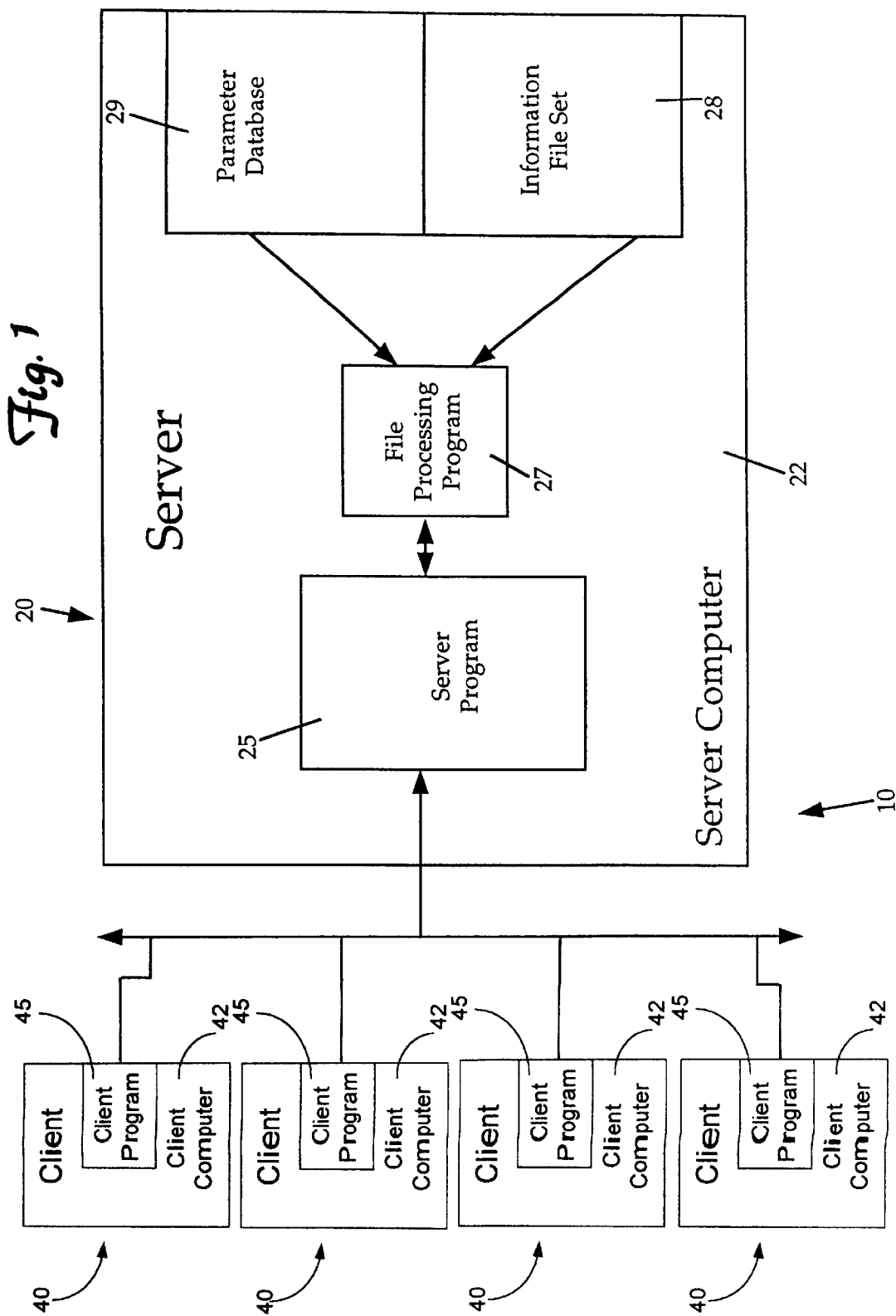

```
202 { <HTML>
204 { <HEAD>
       <TITLE>REPAIR</TITLE>
       </HEAD>
206 { <BODY BGGCOLOR="#C0C0C0" TEXT="#000000" LINK="#0000FF" VLINK="#0000FF">
208 { <H2> This is the procedure for repairing your computer as it is configured pursuant to your work
       order. </H2>
       <!-- If MBD1073, MBD1075, MBD1099, MBD2003 then SHOW
       <P>
210 {  <FONT SIZE="-1">
       Insert Repair Card RC010 into slot C
       </FONT> -->

<!-- If MBD1056, MBD2022 then SHOW
       <P>
212 {  <FONT SIZE="-1">
       Insert Repair Card RC012 into slot C
       </FONT> -->

214 {  <P>
216 {  <FONT SIZE="-1">
       Power up the computer.
       </FONT>

218 { <!-- If MBD1073, MBD1099, MBD2003 then INCLUDE: FILE=Test, SECTION="TD101" -->
220 { <!-- If MBD1075, MBD1078, MBD2011 then INCLUDE: FILE=Test, SECTION="TD201" -->
```

Fig. 3A

```
<HTML>
<HEAD>
<TITLE>TEST</TITLE>
</HEAD>
<BODY BGCOLOR="#C0C0C0" TEXT="#000000" LINK="#0000FF" VLINK="#0000FF">
<H2> This is the procedure for testing your computer as it is configured pursuant to your work order. </H2>
```
⎫
⎬ 235
⎭

230

```
<!-- If MBD1073, MBD1099, MBD2003 then DISPLAY "TD101" -->
<!-- :TD101 -->
<P>
<LI> Insert Test Disk 101 into floppy drive A and initiate start-up diagnostic.
<!-- :/TD101 -->

<!-- :TD103
<P>
<LI> Insert Test Disk 103 into floppy drive A and initiate start-up diagnostic.
:/TD101 -->
```
⎫
⎬ 255
⎭

This is the procedure for repairing your computer as it is configured pursuant to your work order.

Insert Repair Card RC010 into slot C

Power up the computer.

Insert Test Disk 101 into floppy drive A and initiate start-up diagnostic.

METHOD FOR VIEWING AND PROVIDING TO A USER PARAMETER-SPECIFIC INFORMATION

This application is related to and hereby incorporates by reference an application titled A SYSTEM FOR PROVIDING A USER WITH PARAMETER-SPECIFIC INFORMATION, filed on the same date herewith.

1. TECHNICAL FIELD

The present invention relates to providing a user with parameter-specific information.

2. BACKGROUND OF THE INVENTION

In various business applications, human users ("users") are required to process a particular combination of information that corresponds to specific applicable parameters. For example, in manufacturing or servicing a complex product (e.g., a computer or computer board), the product must be assembled, tested, or repaired according to a "parameter-specific" procedure. For example, a computer may be assembled differently depending upon its configuration parameters, such as the operating system to be loaded, the amount of memory to be installed, and whether it is to include a modem. Because there are many possible parameter combinations, numerous parameter-specific procedures must be made available for users who are to perform these procedures.

One solution is to archive and make available to users separate parameter-specific procedure files for each possible parameter combination. These files can be implemented either in the form of digital files—stored, perhaps, in a server database—or in the form of physical documents. Although this approach is effective from the standpoint of a user's ability to perform a procedure, it is not efficient because of the excessive associated materials, space, and time required to generate and maintain such files. Also, there is a great deal of redundancy in this file collection, because many procedures will involve the same or similar steps.

A different approach is to combine all of the possible information for each procedure type into a comprehensive procedure manual (e.g., assembly manual), containing instructions for all products or product sub-assemblies. Conditional expressions can then be used to indicate whether or not an instruction (or instruction sequence) is to be performed based on the applicable parameters. For example, an instruction within a comprehensive procedure may appear as follows: "If Novell OS then Insert Flash disk B.94". This approach reduces the overall documentation, because instructions common to many different parameter-specific procedures need not be repeated for every single optional path in a given procedure. On the other hand, a major drawback to this approach is that human users are required to determine whether or not each conditional instruction within a given procedure containing several optional paths is to be performed. Additional time is required for the user to perform a particular procedure, because the user must continuously compare the parameters defining the particular procedure with the many possible parameters contained within the conditional expressions. Not only is this approach inefficient, but it also increases the likelihood that human error will occur.

Accordingly, what is needed is an efficient solution for maintaining and providing to a user parameter-specific information. In particular, what is needed is an effective method for providing to users the details of parameter-specific procedures.

3. SUMMARY

The present invention provides to a user parameter-specific information. In one embodiment, a server receives from a client a parameter-specific information request, which identifies at least one parameter corresponding to the requested parameter-specific information. A file processing program is then invoked to process a first information file. The file processing program reads from the first information file code segments, including both client-displayable segments and segments executable by the file processing program ("FPP-executable code segments"). If the code segment is client-displayable, the file processing program sends to the client the client-displayable code from the client-displayable code segment. On the other hand, if the code segment is FPP-executable, the file processing program executes the FPP-executable code. In doing so, it sends to the client additional client-displayable code in response to the at least one parameter identified in the information request. The client-displayable code sent to the client is then displayed by the client as its parameter specific information.

4. BRIEF DESCRIPTION OF THE DRAWINGS

FIG. 1 depicts a block diagram of a client/server network for implementing an embodiment of the present invention.

FIG. 3A depicts a portion of a Repair procedure file used in an example described herein.

FIG. 3B depicts portions of a test procedure file used for the example of FIG. 3A.

FIG. 3C shows displayed parameter-specific information resulting from the examples of FIGS. 3A and 3B.

5. DETAILED DESCRIPTION

A client/server network is utilized to provide users with parameter-specific information. In one embodiment, parameter-specific procedures are provided for performing various manufacturing tasks.

5.1 A System and Method for Providing Parameter-Specific Information

As depicted in FIG. 1, a client/server network 10 is used to provide parameter-specific information to each of a plurality of clients 40 where it may be displayed for a user. Parameter-specific information is information generated or selected from a larger set of related information in response to at least one parameter, which is provided by a user. For example, parameter-specific information could be a product-specific procedure that is derived from a set containing instructions for multiple procedures in response to parameters that correspond to a specific product configuration.

Figure 2A:
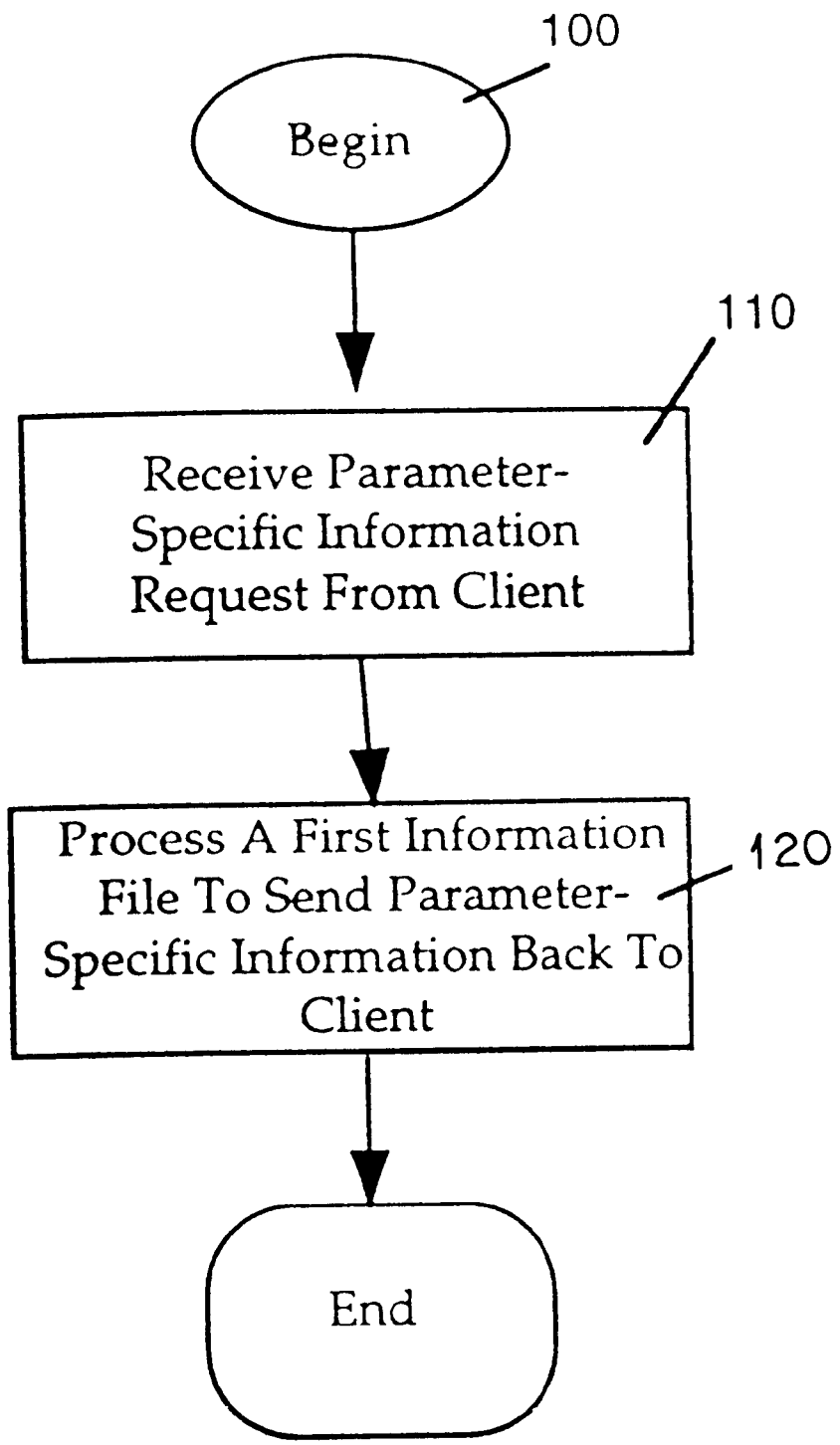
FIG. 2A shows a routine for providing a client parameter-specific information.

FIG. 2A shows routine 100, which is one embodiment of a method for performing the present invention. Initially at 110, a parameter-specific information request is submitted from a client 40 to the server 20. At 120, in response to this request, the server 20 invokes a file processing program ("FPP") 27 to process a first information file that is part of an information file set 28, in order to generate and send back to the client 40 its requested parameter-specific information.

5.1.1 Client/Server Network

In general, client/server network 10 comprises at least one server 20 in network communication with a plurality of clients 40. The client/server network 10 may be implemented in any suitable network environment such as a local area network ("LAN"), a wide area network ("WAN"), an intranet, or an internet. In addition, one of a variety of client/server architectures may be used, including TCP/IP (HTTP network), Digital Equipment Companies, NAS and IBM's SAA.

Although the client/server network 10 of FIG. 1 depicts only one server 20, it should be recognized that more than one server 20 could be used, depending upon particular network requirements. For example, multiple redundant servers could be implemented for both faster operation and enhanced reliability. Moreover, an additional server (or servers) could be used as a gateway to server 20.

5.1.1.1 Server

A server is a computer that runs a server program to service clients within the client/server network. Server 20 includes a server computer 22, a server program 25, and a file processing program 27 for generating and providing to the client parameter-specific information from information file set 28. In one embodiment, server 20 may also include a parameter database 29 for storing parameters, which may be retrieved by the file processing program 27 in response to a parameter-specific information request.

The configuration of server 20 corresponds to the implemented client/server network architecture. For example, a Web (HTTP) server would typically be used with an TCP/IP architecture.

5.1.1.1.1 Server Computer

The server computer 22 executes both server program 25 and the file processing program 27. The server computer 22 (in connection with its operating system) should be capable of serving the entire plurality of clients 40. The server computer may be—but is not limited to—a mainframe, a workstation, or a personal computer.

5.1.1.1.2 Server Program

When executed by server computer 22, server program 25 controls and in some cases performs the various functions of server 20. For example, responsive to a parameter-specific information request, server program 25: (1) transfers information from server 20 to the requesting client 40, and (2) invokes the file processing program 27 to process a first information file from information file set 28 in order to generate parameter-specific information for the requesting client. Server program 25 can be any server program that complies with the applicable network architecture and operates on the selected server computer 22. For example, with an HTTP network, server program 25 could be a UNIX™ Web server (e.g., NCSA™, Apache™, CERN™, Netscape™), a Windows™ 95/NT Web server (e.g., NT351™, WebSite™), or any other appropriate server program.

5.1.1.1.3 Information File Set

The information file set 28, contains possible information that may be sent back to a client 40 as parameter-specific information. It comprises at least one information file, which corresponds to an information type from an information group. In addition, information file set 28 is accessible to the file processing program 27 and may be stored on the server computer 22. Each file within the information file set 28 includes both client-displayable code and FPP-executable code, which are processed by the file processing program 27.

Client-displayable code is code that causes or affects the display of information at a client 40. For example, when the network 10 is an HTTP network and, in turn, each client 40 is running a Web browser, client-displayable code would include executable Hypertext Markup Language ("HTML") tags, but would not include HTML comments.

FPP-executable code is code that may be identified and executed by the file processing program 27. It comprises conditional parameter commands, which cause client-displayable code corresponding specifically to parameter-specific information to be sent to a client responsive to parameters that were identified by the client. It may also comprise jump commands for altering the execution sequence of the file processing program 27 and labels for marking both clientdisplayable and FPP-executable code segments.

5.1.1.1.4 File Processing Program

In one embodiment, the file processing program 27 is executed by server computer 22. Responsive to a parameter-specific information request (which invokes the file processing program 27, identifies parameters, and identifies a first information file), the file processing program 27 processes at least the first information file from information file set 28 in order to generate parameter-specific information. The parameter-specific information is then sent back to client 40 via server program 25.

The file processing program 27 should be capable of: (1) operating within server 20; (2) reading and identifying code segments within an information file; (3) sending back to the client 40 client-displayable code segments; and (4) executing FPP-executable code to locate and send back to the client 40 additional client-displayable code responsive to identified parameters.

5.1.1.1.4.1 Operation with Server

When executed on the server, file processing program 27 should be designed to operate within server 20. This means that it should be able to communicate with server program 25 in order to receive parameter-specific information requests and send back to the client 40 parameter-specific information. In addition, it should have access to the information file set 28 and parameter database 29. In one embodiment, when server 20 is a Web server, file processing program 27 may be implemented with a common gateway interface, "CGI" or a Java script program (which could be executed at the client). Moreover, it may be written in any suitable language, e.g., Java, C, Visual Basic.

5.1.1.1.4.2 Reading and Identifying Code Segments

A "code segment" is an arbitrarily defined unit of code that depends upon the particular design of the file processing program 27 in connection with the possible code that may be part of an information file. The design of the file processing program 27 should enable it to read and identify code segments within an information file. Thus, the file processing program 27 should be able to determine the beginning and the end of a code segment. For example, in one embodiment, a code segment could simply be defined as a line of code. In another embodiment, special characters or "marks" could be used as "bookends" to indicate the boundaries of a code segment. For example, when client-displayable code is executable HTML code, a code segment could be defined as an HTML tag. With this definition, an HTML comment is a code segment even though it is not executable HTML.

The file processing program 27 should also be able to identify whether a code segment is a client-displayable, an FPP-executable, or a null (i.e., neither client-displayable nor FPP-executable) code segment. A client-displayable code segment is a code segment that includes client-displayable code and is identified to the file processing program 27 as a client-displayable code segment. An FPP-executable code segment is a code segment that includes FPP-executable code and is identified to the file processing program 27 as an FPP-executable code segment.

In one embodiment, a client-displayable code segment could simply be defined as a code segment that drives the display of information at the client. Alternatively, it could be defined as a code segment that does not include any FPP-executable mark. An FPP-executable code segment could be defined as a non-client-displayable code segment that includes FPP-executable code. It could also be defined as a code segment that includes an FPP-executable mark. In one embodiment with an HTTP network, a client-displayable code segment could be defined as being an executable HTML tag, and an FPP-executable code segment could be an HTML comment that includes FPP-executable code. (Note that with this embodiment, the file processing program is able to effectively identify FPP-executable code by recognizing an HTML comment and determining whether the comment includes any FPP-executable code. Not only do the HTML comment tags serve as convenient marks for identifying possible FPP-executable code, but also, they enable all information (from an information file) not embedded within a comment to be directly displayed with a browser without interference from FPP-executable code.)

5.1.1.1.4.3 Sending Client-Displayable Code Segments

After a client-displayable code segment has been identified as such, the file processing program 27 sends it to the server program 25, which sends it along to the client 40. This may be implemented in various ways. In one embodiment, each code segment could be sent to the server program 25 on a real-time basis as it is identified by the file processing program 27. In an alternative embodiment, the file processing program could write the client-displayable code to an output file, which could be sent to the client 40 after the file processing program 27 is done processing.

5.1.1.1.4.4 Executing FPP-Executable Code

Once an FPP-executable code segment has been identified, the file processing program 27 executes any FPP-executable command(s) contained within the code segment. In one embodiment, FPP-executable code comprises conditional parameter commands, jump commands, and flags.

A conditional parameter command is an instruction whose execution depends on the status of at least one given parameter identified by the client 40. The command references a section of client-displayable code that will be provided to the client if the condition is met. Different conditional parameter commands can be used to reference client-displayable code sections that are located in various areas of the information file set 28. For example, conditional parameter commands can instruct the file processing program 27 to send out a client-displayable code section obtained from (1) the FPP-executable command currently being executed; (2) some other location within the information file currently being processed; or (3) some other location within a different information file. In one embodiment, these conditional parameter commands are known as "show", "display", and "include" commands, respectively.

A jump command is an instruction that directs the file processing program to process a different code segment within the information file set, and a flag is used as an address, e.g., for a section of client-displayable code or for a jump destination code segment. (It should be noted that a flag could be, for example, an HTML flag that is not contained within an HTML comment. With the use of such flags in connection with the exclusive use of conditional parameter commands that do not include client-displayable code but reference flagged sections instead, all client-displayable code within an information file can be displayed with a browser. This can be beneficial for reviewing and updating an information file set.)

5.1.1.1.5 Parameter Database

In one embodiment, a parameter database 29 is used to store parameters, which may be retrieved by the file processing program 27. The parameters to be retrieved are identified with a parameter-specific information request from a client 40. When a parameter database 29 is used, the parameter-specific information request includes an identifier that serves as a pointer to identify for retrieval one or more parameters that correspond to the identifier. In turn, the file processing program 27 uses the retrieved parameters to extract additional parameter-specific information from the information file set 28 pursuant to conditional parameter commands.

The parameter database 29 may be implemented with any data structure that is accessible to the file processing program 27. For example, the parameter database 29 could simply be a set of files stored on server computer 22, with each file being referenced with a pointer and accessible to the file processing program 27. Alternatively, the parameter database 29 could be part of a database program in communication with file processing program 27. The parameter database 29 could also be incorporated directly into the file processing program 27.

5.1.1.2 Client

As depicted in FIG. 1, network 10 includes a plurality of clients 40. With a client 40, a user may: (1) submit to the server 20 a parameter-specific information request, and (2) view the displayed information that results from this request. Each client 40 includes a client computer 42 and a client program 45, which is executed by the client computer 42.

5.1.1.2.1 Client Computer

The client computer 42 may be any computer (e.g., a personal computer) that is capable of executing client program 45 in network communication with server 20.

5.1.1.2.2 Client Program

When executed, client program 42 implements the functions of the client 40. Client program 42 may be any suitable client program in connection with the configuration of network 10. For example, when network 10 is an HTTP network, client program 45 may be any operative Web browser including Netscape's Navigator™ and Microsoft's Internet Explorer™ programs.

5.1.2 Parameter-Specific Information Request

With reference to FIG. 2A, in order to provide a user with parameter-specific information, the server 20 initially receives from a client 40 a parameter-specific information request at 110. Upon receiving this request, it processes at least a first information file and sends back to the client 40 parameter-specific information at 120.

A parameter-specific information request is a request from a client 40 to the server 20 for information specified by certain client-supplied parameters. Such a request transfers to server 20: (1) an information type, which corresponds to a first information file from the information file set 28; (2) parameter identification, which is or references at least one parameter; and (3) a command to invoke the file processing program to process the first information file. In one embodiment, with an HTTP network, a combination of hypertext links and HTML forms may be used to implement the parameter-specific information request.

5.1.2.1 Information Type

Information types define the general information options that belong to an informational group. For example, an informational group such as "manufacturing and service procedures" might include three information types: assembly, test, and repair. If a user desired parameter-specific repair information, its parameter-specific information request would indicate "repair" as the information type.

Each information type has a corresponding information file within the information file set 28. The file processing program 27 processes as the first information file the information file corresponding to the information type that has been transferred within the parameter-specific information request.

The information type may be transferred to the server 20 in various ways. For example, with an HTTP network the information type may be transferred through a hypertext link. Alternatively, it could be transferred via an HTML form, along with or separately from the parameter identification.

5.1.2.2 Parameter Identification

Parameters are used by the file processing program 27 to extract from the information file set 28 parameter-specific information, which is to be sent to a client 40. Parameter identification—which is transmitted to the server 20 through a parameter-specific information request—may be actual parameter(s), or alternatively, it may be an identifier (or pointer) that points to parameter(s) stored in the parameter database 29. Thus, the file processing program 27 receives through parameter identification parameters specified either directly by the client 40 or indirectly by reference to the parameter database 29.

As an example, the parameters for the "manufacturing and service procedure" informational group of the preceding section could correspond to the various component/configuration options of a personal computer. In one embodiment, a user could enter and directly transmit to the server 20 the applicable parameters for a parameter-specific information request. In another embodiment, the user could simply submit a work order identifier, which would point to the applicable combination of parameters for the parameter-specific information request.

As with information types, parameter identification (i.e. parameters or identifiers) may be transferred to the server 20 within a parameter-specific information request in a variety of ways. With an HTTP network, hypertext links, forms, or any other adequate method may be implemented.

5.1.2.3 File Processing Program Invocation

A command that invokes the file processing program to begin processing the first information file (which corresponds to the selected information type) is also passed within the parameter-specific information request. Depending upon the configuration of the server 20, the form of the command should be selected to meet this criterion. For example, with an HTTP server configuration and a CGI file processing program 27, an HTML form could be used in this manner to invoke the file processing program 27.

5.1.3 Information File Processing

With reference to FIG. 2A, at 120, a first information file from the information file set 28 is processed in order to send to a client 40 parameter-specific information responsive to a parameter-specific information request. In general, "processing" involves progressing—in an ordered manner as dictated by the information file being processed—through at least the first information file in order to send "applicable" client-displayable code (which corresponds to parameter-specific information) to the client 40. Applicable client-displayable code is derived from: (1) client-displayable code segments, and (2) satisfied conditional parameter commands.

After the file processing program 27 has been invoked, it begins processing the first information file, which is the information file corresponding to the selected information type. Depending upon the FPP-executable commands that it encounters, the file processing program 27 may also be directed to process portions of other files within the information file set 28. This allows client-displayable code from anywhere in the information file set 28 to be utilized and sent back to the client 40. In one embodiment, the file processing program 27 returns back to the first information file (at the place from where it departed) after executing the section of FPP-executable code located outside of the first information file. It proceeds by processing the next code segment of the first information file. In this manner, the sequence of the code segments within the first information file control the flow and thus the order of the client-displayable code that is being sent to the client 40 as parameter-specific information. The file processing program 27 continues this processing until it reaches the end of the first information file.

Figure 2B:
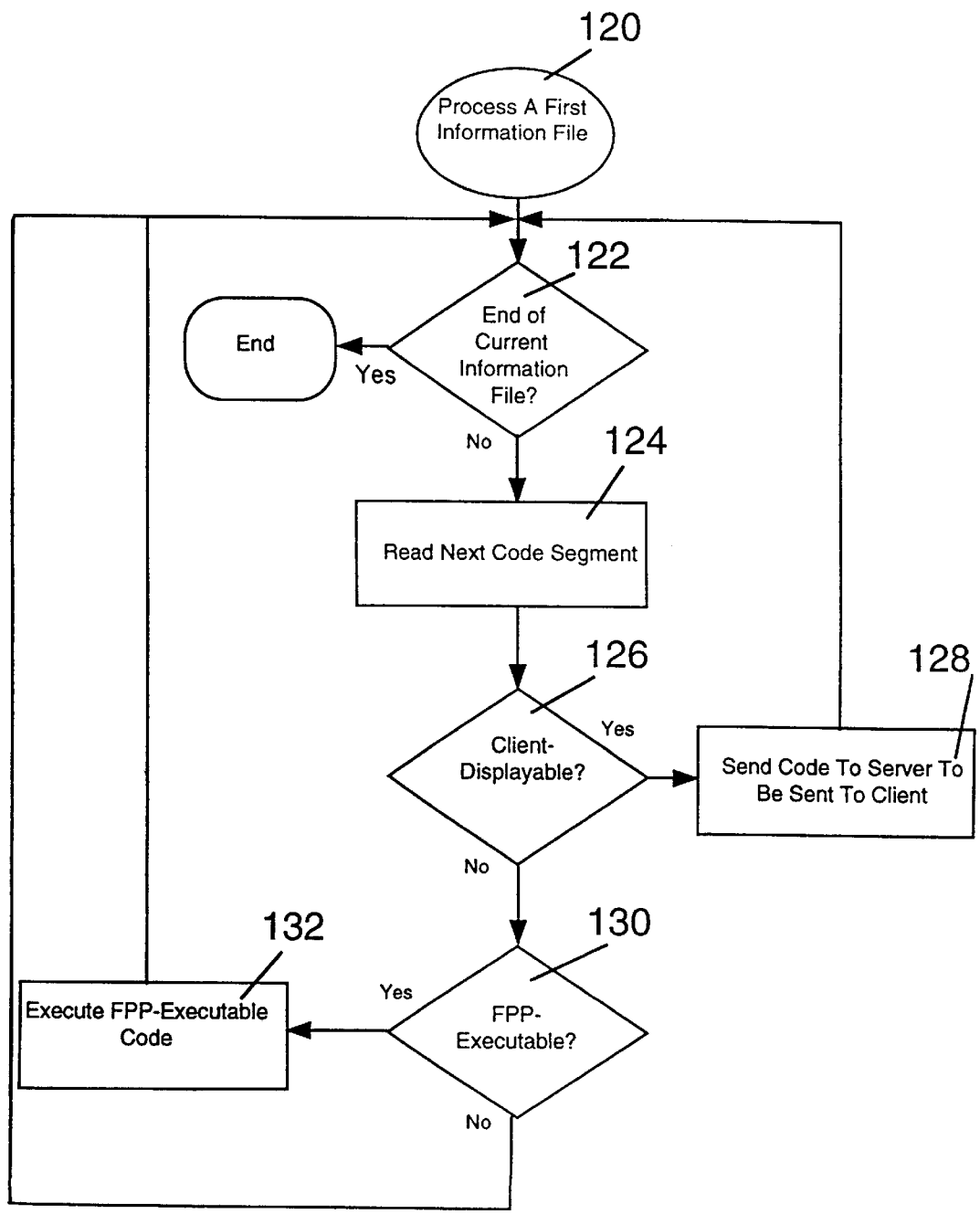
FIG. 2B shows a routine for processing a first information file.

FIG. 2B shows one embodiment of a routine for processing a first information file at 120. Initially at 122, the routine determines whether it has completed processing the information file that is currently being processed. (Processing is initiated at the beginning of the first information file.) If not at the end, the routine proceeds by reading a next code segment at 124. (If the routine is at the beginning of the file, the next code segment is the first code segment of the file.) Next, at 126, the routine determines whether or not the previously read code segment is client-displayable code. If so, it sends the code segment to the server 20 to be sent to the client 40 at 128, and it returns back to the beginning of the routine at 122. Otherwise, if the code segment is not client-displayable at 126, the routine proceeds by determining whether it is an FPP-executable code segment at 130. If it is FPP-executable code, the code is executed at 132. Otherwise, the code segment is skipped and the routine proceeds back to its beginning at 122.

Figure 2C:
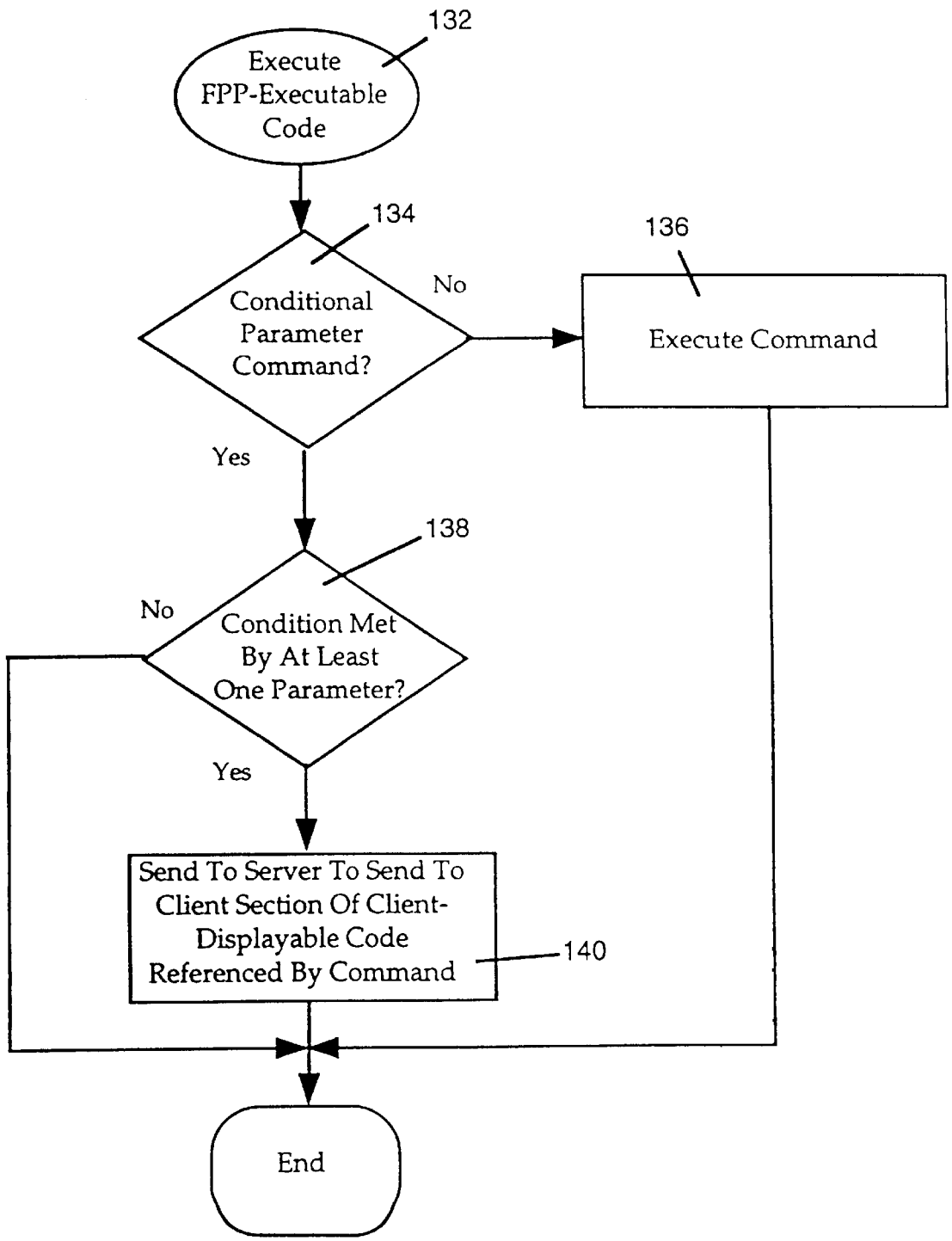
FIG. 2C shows a routine for executing FPP-executable code.

FIG. 2C depicts one embodiment of a routine for executing FPP-executable code at 132. At 134 the routine determines whether the FPP-executable code is a conditional parameter command. If the FPP-executable code is not a conditional parameter command, the routine executes the command (e.g., jumps to a different location within the information file set 28) and terminates routine 132, thereby causing routine 120 of FIG. 2B to loop back to its beginning at 122. If, however, the FPP-executable code is a conditional parameter command, the routine determines, at 138, whether the condition is satisfied, based on the at least one parameter identified by the client 40. If the condition is met at 140, the section of client-displayable code referenced within the command is sent to the server program 25 to be sent to the client 40. If, on the other hand, the condition is not met at 138, routine 132 is terminated, thereby causing routine 120 of FIG. 2B to loop back to its beginning at 122.

5.2 Example

In the following example, one embodiment of the present invention is used to implement a parameter-specific manufacturing procedures retrieval system. This system provides to a user a parameter-specific procedure for performing a selected computer manufacturing procedure from a set of related procedure types (i.e., assembly, test, repair).

For this example, the client/server network 10 is an HTTP network. Server program 25 is a Web server and client programs 45 are Web browsers. Also with this example, the file processing program 27 is implemented as a compiled CGI program written in C. In addition, client-displayable code segments are executable HTML code, and FPP-executable code segments are HTML comments embedded with PPP-executable code.

Information files are now more particularly referred to as procedure files. In turn, the information file set 28 is now the procedure file set; information file types are now procedure file types; and parameter-specific information requests are now parameter-specific procedure requests.

Assume that a user desires a repair procedure for a computer with a configuration defined by work order number WO1066 (which is an identifier to at least one configuration parameter). Also, assume that one of these parameters is MBD1073, which is the part number of a motherboard used with the computer to be repaired.

With this example, the user initially submits to the server (through his/her browser) an HTTP request for the Manufacturing Procedures Home Page. In response thereto, server 20 returns the HTML file that corresponds to this home page, which causes the browser to display it at the client 40. The home page includes at least three Hypertext links: an Assembly link, a Test link, and a Repair link. The user then selects the Repair link, which corresponds to the Repair procedure file within procedure file set 28. In response, server 20 sends back to the client 40 an HTML Form for "Repair" as the selected procedure type. In this form, the user enters its work order number: WO1066 and submits the form to the server 20. (At this point, the user has transmitted to server 20 a parameter-specific procedure request. The parameter-specific procedure request includes a procedure type [i.e., repair via the Hypertext link], parameter identification [i.e., work order number WO1066 via the HTML form], and a file processing program invocation command, which is included within the user's HTML form transmission to server 20.)

In response to the user completing its parameter-specific procedure request (i.e., transmitting its form submission), server 20: (1) passes to file processing program 27 the parameter identifier WO1066; and (2) invokes file processing program 27 to begin processing the first procedure file, which is the Repair file. Before actually processing the Repair file, file processing program 27 retrieves from parameter database 29 all parameters that are indexed by WO1066 (one of which is MBD1073).

FIG. 3A shows the beginning portion of Repair file 200. Repair file 200 includes code segments 202 through 220. Note that code segments 202, 204, 206, 208, 214, and 216 are client-displayable code segments, and code segments 210, 212, 218, and 220 are FPP-executable code segments, because they are HTML comments embedded with FPP-executable code.

FIG. 3B shows the beginning portion 235 and an interior portion 255 of Test file 230. Interior portion 255 includes code segment 257, which is an FPP-executable code segment. Note that the FPP-executable code embedded within code segment 257 includes an FPP-executable flag 258, which marks (or points to) client-displayable code section 259.

With this example, the file processing program 27 processes the first procedure file (i.e., Repair file 200) pursuant to routine 100. In doing so, it sends back to the client client-displayable code, which causes web browser 45 to display parameter-specific information 260, as shown in FIG. 3C. The parameter-specific information 260 is derived from both the client-displayable code segments 202, 204, 206, 208, 214, and 216 and the FPP-executable code segments that contain conditional parameter commands having MBD1073 as a predicate parameter (i.e., code segments 210 and 218). This example demonstrates how streamlined, parameter-specific information may be provided to a user from a comprehensive—and possibly massive—information file set.

5.3 Other Embodiments

While the present invention has been primarily described with reference to one embodiment thereof, those skilled in the art will recognize various changes that may be made without departing from the spirit and scope of the claimed invention.

For example, with an HTTP network, client-displayable code segments could simply be defined as any HTML tag other than a comment tag. In addition, an information file set could contain only one information file. With such an embodiment, a parameter-specific information request would not have to include a selected information type. Moreover, the file processing program could include a library of commonly-used client-displayable code sections which could be referenced with appropriate FPP-executable commands.

Also, while the client user has been described in terms of a human user that will read and act on instructions displayed on a client computer screen, the user could also be a piece of automated equipment that receives machine instructions that correspond to operations the automated equipment can execute. Moreover, the invention is applicable to a human user that receives instructions on a client computer screen and has the further facility of forwarding some or all of those instructions to a piece of automated equipment that can perform a complex operation more efficiently than a human and that can be provided the instructions for that operation in a machine executable form directly from the information file set. In this case the client 40 is a human-machine combination.

Furthermore, while the file processing program has primarily been described as being executed by a server computer, persons of ordinary skill will recognize that the principles set forth herein could be implemented with a file processing program that is sent to and executed by the client. Information could be initially downloaded to the client along with the file processing program, or alternatively, the file processing program could access information from the server as needed on a real-time basis.

Accordingly, the invention is not limited to what is shown in the drawings and described in the specification but only as indicated in the appended claims.

5.4 Remarks

The system and method described provide to users parameter-specific information, which significantly reduces the number of conditional decisions the user is required to make. In addition, it eliminates the need for the creation, storage, and maintenance of numerous different parameter-specific files (e.g., documents, computer files), because the parameter-specific information is generated on demand from a comprehensive information file set. It also makes it easier to update the information base from which the parameter-specific information is derived because the need for redundant information sections across multiple information types is eliminated.

What is claimed is:

1. A method for viewing a parameter-specific procedure, the method comprising:

submitting from a client to a server a parameter-specific procedure request having parameter identification and a selected procedure type; and invoking a file processing program to process at least a first procedure file within a procedure file set, the first procedure file corresponding to the selected procedure type; and receiving a parameter-specific procedure generated from the processing of the at least a first procedure file, the parameter specific procedure being responsive to at least one parameter corresponding to the parameter identification, wherein the act of invoking causes the at least one parameter to be retrieved from a parameter database responsive to the parameter identification, wherein the act of submitting from a client to a server a parameter-specific procedure request having parameter identification includes submitting from a client to a server a work order that corresponds to a product configuration.

2. A method for viewing a parameter-specific procedure, the method comprising:

submitting from a client to a server a parameter-specific procedure request having parameter identification and a selected procedure type; and invoking a file processing program to process at least a first procedure file within a procedure file set, the first procedure file corresponding to the selected procedure type; and receiving a parameter-specific procedure generated from the processing of the at least a first procedure file, the parameter specific procedure being responsive to at least one parameter corresponding to the parameter identification, wherein the act of invoking causes the at least one parameter to be retrieved from a parameter database responsive to the parameter identification, wherein the act of receiving a parameter-specific procedure includes receiving client-displayable code if the condition within a conditional parameter command is satisfied by the at least one parameter.

3. The method of claim 2, wherein the act of receiving client-displayable code if the condition within a conditional parameter command is satisfied by the at least one parameter includes receiving client-displayable code from a second procedure file.

* * * * *